United States Patent [19]

Ishino et al.

[11] 4,068,301
[45] Jan. 10, 1978

[54] DATA STORAGE DEVICE COMPRISING SEARCH MEANS

[75] Inventors: Yoshiaki Ishino; Yoshiaki Kondo, both of Tokyo, Japan

[73] Assignee: Ricoh Company, Ltd., Tokyo, Japan

[21] Appl. No.: 621,900

[22] Filed: Oct. 14, 1975

[30] Foreign Application Priority Data

Oct. 15, 1974  Japan ................................ 49-118416

[51] Int. Cl.² .............................................. G11C 7/00
[52] U.S. Cl. .................................................... 364/200
[58] Field of Search ......................................... 364/200

[56] References Cited

U.S. PATENT DOCUMENTS

| | | | |
|---|---|---|---|
| 3,601,809 | 8/1971 | Gray et al. ........................ | 340/172.5 |
| 3,633,179 | 1/1972 | Reynolds ........................... | 340/172.5 |
| 3,693,165 | 9/1972 | Reiley et al. ..................... | 340/172.5 |
| 3,848,235 | 11/1974 | Lewis et al. ..................... | 340/172.5 |

Primary Examiner—Raulfe B. Zache
Assistant Examiner—C. T. Bartz
Attorney, Agent, or Firm—Frank J. Jordan

[57] ABSTRACT

A gate unit is connected between a central processing unit and a storage means such as a drum or disc memory. A comparator unit is operative to store therein a data search item. In the data search mode, the gate means sequentially gates data items from the storage means into a buffer register having an output connected to an input of the comparator unit. The gate means is controlled to gate a data item in the buffer register to the central processing unit only when the data item corresponds to the search item stored in the comparator unit. The comparator unit may perform AND, OR, magnitude or any other type of comparison which is required.

8 Claims, 7 Drawing Figures

DATA STORAGE DEVICE COMPRISING SEARCH MEANS

The present invention relates to a data storage device comprising search means.

In known data processing systems, a storage means such as a disc or drum memory is connected to store data required for computation by a central processing unit. The central processing unit is operative to search the data in the storage means to locate various data items when required. The search operation may also include sorting the data in such a manner that all data fulfilling some requirement such as being greater in magnitude than a selected value is retrieved.

In known data processing systems, the central processing unit examines each data item in the storage means sequentially during a search operation and retrieves the data corresponding to the data search item or parameter. It is therefore necessary to transmit each data item from the storage means to the central processing unit. This requires a large amount of time and engages the central processing unit so that it is not available for computation.

It is therefore an object of the present invention to provide a data storage device operative to perform data search or sorting operations to thereby free a central processing unit for computation during the search or sorting operation.

The above and other objects, features and advantages of the present invention will become clear from the following detailed description taken with the accompanying drawings, in which.

Figure 1:
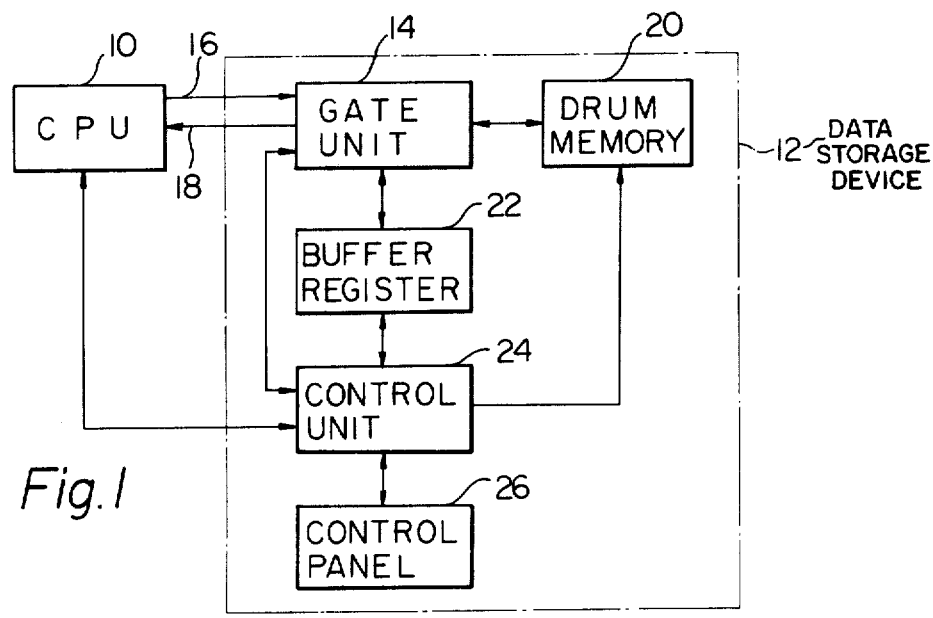
FIG. 1 is a block diagram of a data storage device embodying the present invention connected to a central processing unit.

Referring now to FIG. 1, a central processing unit 10 such as a minicomputer is connected to a data storage device 12 embodying the present invention. The data storage device 12 comprises a gate unit 14 having a data input 16 and a data output 18 which are connected to the central processing unit 10. The gate unit 14 is also connected to a main storage means such as a drum memory 20 and an auxiliary storage means such as a buffer register 22. A control unit 24 is connected to control the buffer register 22, gate unit 14 and drum memory 20. The control unit 24 is in turn controlled by the central processing unit 10. A control panel 26 is provided for manual input of data or instructions and is connected to the control unit 24.

Figure 2A:
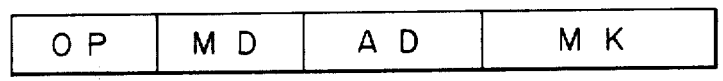
FIGS. 2a to 2e are diagrams illustrating operational instructions for the data storage device.
Figure 2B:
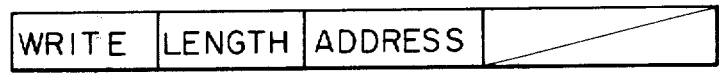

Referring now to FIG. 2a, an instruction word which is fed from the central processing unit 10 to the data storage device 12 includes OP, MD, AD and MK designations.

As shown in FIGS. 2b to 2e, the OP designation may be WRITE, READ or SEARCH. When the OP designation is WRITE or READ, the MD designation indicates the length of the data to be read or written in the drum memory 20. When the OP designation is SEARCH, the MD designation indicates the mode of searching such as AND, OR, magnitude comparison, sequential searching with or without skips or the like.

Figure 2C:
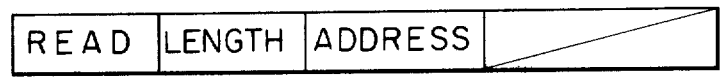
Figure 2D:
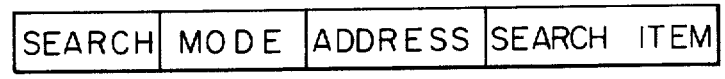

The MK designation is only used in the search operation illustrated in FIG. 2d and indicates a data search item. The data search item may, for example, be a predetermined number such that all data items in a selected portion of the drum memory 20 having a magnitude larger than the predetermined number will be retrieved. The AD designation indicates the first address in the drum memory 20 to be accessed during a write, read or search operation.

Figure 3:
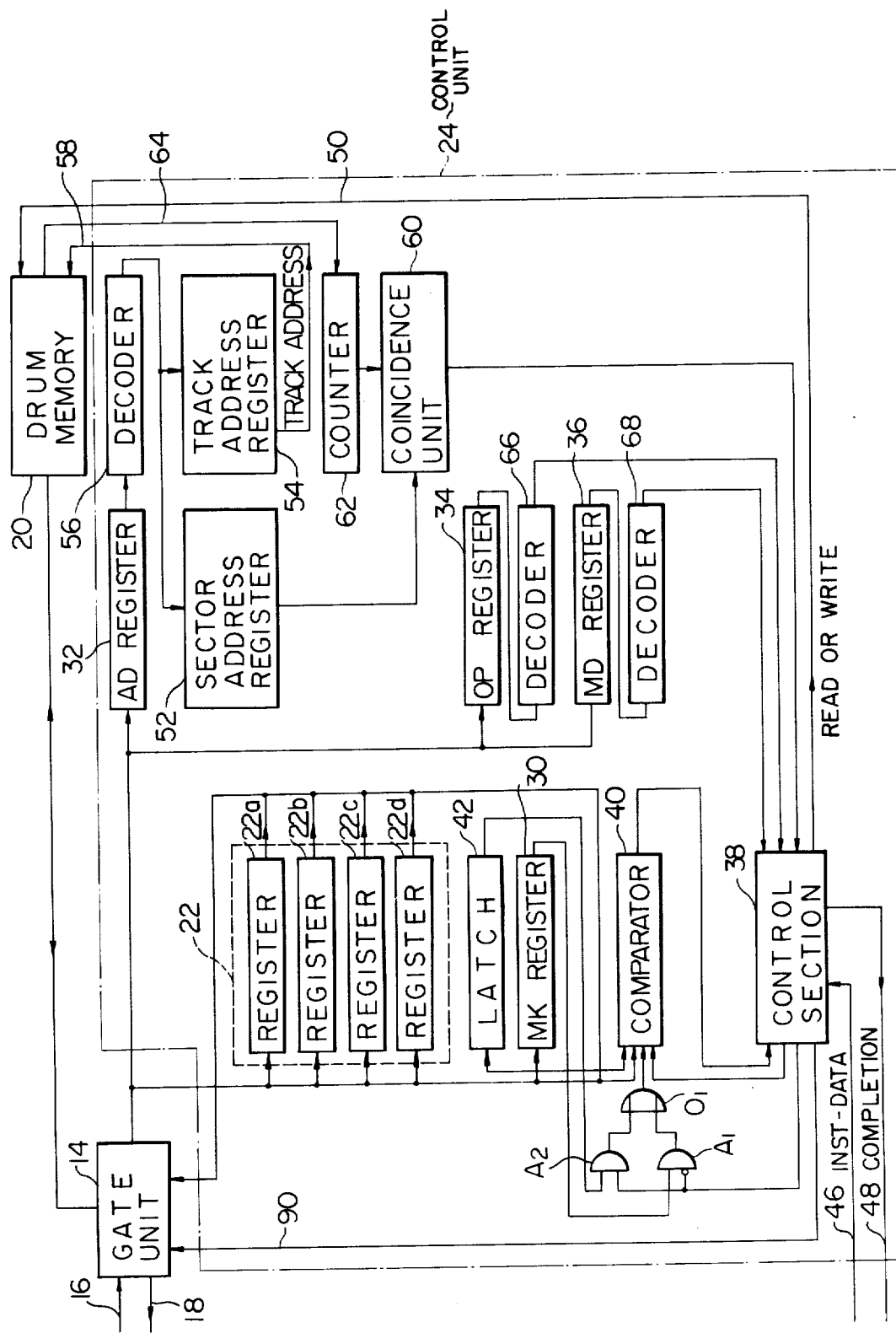
FIG. 3 is a block diagram illustrating the data storage device in greater detail.

Referring now to FIG. 3, the buffer register 22 comprises a plurality of shift registers operative to store a predetermined maximum number of data items. The shift registers are shown as being four in number and are designated as 22a to 22d. The gate unit 14 has an output connected to inputs of the buffer register 22, an MK register 30, an AD register 32, an OP register 34, an MD register 36 and a comparator 40. The registers 30, 32, 34 and 36 are operative to store therein the MK, AD, OP and MD designations of the instruction word shown in FIG. 2a respectively. The output of the MK register 30 is connected to an input of an AND gate A1, the output of which is connected through an OR gate O1 to an input of the comparator 40. The control unit 24 comprises a control section 38 which has an output connected to an inverting input of the AND gate A1 and to a non-inverting input of an AND gate A2. The output of the AND gate A2 is connected through the OR gate O1 to an input of the comparator 40.

A latch 42 has an input connected to an input of the buffer register 22 and an output connected to an input of the AND gate A2. The output of the shift registers 22a, 22b, 22c or 22d to be fed to the latch 42 may be selected by the control section 38.

The control section 38 has an instruction-data input connected to the central processing unit 10 through a line 46 and a completion-of-operation output connected to the central processing unit 10 through a line 48. The control section 38 further has a read-write output connected to the drum memory 20 through a line 50.

The output of the AD register 32 is connected to inputs of a sector address register 52 and a track address register 54 through a decoder 56. The track address register 54 has track address output connected to the drum memory 20 through a line 58. The output of the sector address register 52 is connected to an input of a coincidence unit 60. The drum memory 20 is arranged to feed sector timing pulses to a counter 62 through a line 64. The output of the counter 62 is connected to an input of the coincidence unit 60. The output of the coincidence unit 60 is connected to the control section 38. The outputs of the OP and MD registers 34 and 36 are connected to the control section 38 through decoders 66 and 68 respectively.

The operation of the data storage device 12 will now be described with reference to the drawings.

WRITING

To write data onto the drum memory 20, the central processing unit 10 feeds a signal indicating that data is about to be fed to the control section 38 through the line 46. The control section 38 thereby controls the gate unit 14 to gate the data into the buffer register 22. The central processing unit 10 then feeds a signal indicating that an instruction is about to be fed to the data storage device 12 to the control section 38 through the line 46. The control section 38, in response, controls the gate unit 14 to gate the respective designations of the instruction word of FIG. 2b into the registers 32, 34 and 36. The WRITE designation in the OP register 34 controls the control section 38 to perform a write operation. The address of the first memory element of the drum memory 20 into which the data is to be written consists of two designations: a track address and a sector address which are decoded by the decoder 56 and stored in the registers 54 and 52 respectively. The track address register 54 feeds the track address to the drum memory 20 through the line 58 to select the proper write head (not shown). Sector timing pulses are fed from the drum memory 20 to the counter 62 through the line 64. When the count in the counter 62 reaches the same value as the number in the sector address register 52 indicating that the required sector of the drum memory 20 is in the writing position, the coincidence unit 60 feeds an output to the control unit 38 which in turn feeds write pulses to the drum memory 20 through the line 50. The number of write pulses fed to the drum memory 20 is determined by the length of the data to be written which is stored in the MD register 36. The data is thereby stored in the correct place in the drum memory 20. After the write pulses are terminated by the control section 38, the control section 38 feeds a completion-of-operation signal to the central processing unit 10 through the line 48.

READING

To perform a reading operation, the central processing unit 10 feeds a signal through the line 46 to the control section 38 indicating that an instruction will be fed to the data storage device 12. The READ instruction shown in FIG. 2c is then fed through the gate unit 14 into the registers 32, 34 and 36 as in the write operation. The control section 38 is controlled to perform a read operation by the READ designation in the OP register 34 and feeds read signals to the drum memory 20 through the line 50 and controls the gate unit 14 to gate the required data items into the buffer register 22. The operation designating the correct track and sectors of the drum memory 20 is essentially identical to that of the write operation described above. After the data is entered into the buffer register 22, the control section 38 controls the gate unit 14 to feed the data to the central processing unit 10.

SEARCHING

A data search operation is one in which data in the drum memory 20 fulfilling some particular requirement such as being greater in value to a predetermined number is to be selectively retrieved. In accordance with the present invention, the search operation may be performed in a number of ways, two of which will be described.

The first method uses the instruction format shown in FIG. 2d, in which a SEARCH designation is stored in the OP register 34 to control the control section 38 to perform a search operation and a MODE designation is stored in the MD register 36. The MODE designation may instruct the control section 38 to search all data from the portion of the drum memory 20 designated by the address stored in the AD register 32 in the buffer register 22. Other mode designations include AND and OR searching and sequential searching with or without skipping.

A search data item is stored in the MK register 30. The search item may be, for example, a predetermined number such that all data items in the designated portion of the drum memory 20 having a value greater than the predetermined number are to be stored in the buffer register 22. The track and sector address operation is identical to that described above.

It will be assumed that the MODE designation instructs the control section 38 to utilize the instruction format shown in FIG. 2d. The control section 38 then applies a logically low signal to the inputs of the AND gates A1 and A2 to enable the AND gate A1 and inhibit the AND gate A2. The contents of the MK register 30 are thereby applied to the comparator 40. The comparator 40 is preferably operative to function in a number of comparison modes as described above under the control of the control section 38.

The control section 38 controls the drum memory 20, gate unit 14 and buffer register 22 in such a manner that the data from the drum memory 20 is sequentially stored in the buffer register 22 and fed therefrom into the comparator 40. The comparator 40 thereby compares the data item with the data search item in the buffer register 22. If the data item in the buffer register 22 fulfills the search requirement, it is retained in the buffer register 22. If it does not fulfill the requirement, it is deleted. The data items which fulfill the search requirement are fed from the buffer register 22 to the central processing unit 10 for computation or the like.

Figure 2E:
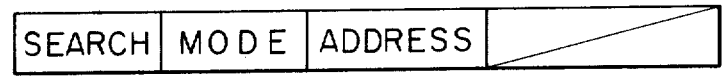

In the second search method using the instruction format of FIG. 2e, the data search item is set into the latch 42 from the buffer register 22. In this case, the control section 38 applies a logically high signal to the inputs of the AND gates A1 and A2 to enable the AND gate A2 and inhibit the AND gate A1 so that the output of the latch 42 is applied to the input of the comparator 40. The operation is otherwise identical.

Many modifications are possible for those skilled in the art within the scope of the invention after receiving the teachings of the present disclosure. For example, in the read and write operations, the data may be gated directly between the central processing unit 10 and the drum memory 20 without storing it in the buffer register 22. The drum memory 20 may be replaced by a disc memory, tape memory, core memory, semiconductor memory or the like. It will be seen that the data storage device of the present invention is especially useful in a time sharing computer system since the central processing unit is free for computation while the data storage device performs the searching operation. The present data storage device can furthermore be manufactured efficiently on a commercial production basis thereby reducing the cost of a computer installation.

What is claimed is:

1. A data storage device, comprising:
   a main storage means operative to store data items therein;
   an auxiliary storage means;
   a gate means operatively connected to the main storage means and the auxiliary storage means;
   a comparator means operative to store therein a data search item and having an input connected to the auxiliary storage means, the comparator means being operative to compare the data search item with the data items in the auxiliary storage means; and
   a control means operatively connected to said gate means, said control means having an input connected to the comparator means and being operative to control the gate means in such a manner as to sequentially gate the data items from the main storage means into the auxiliary storage means and to retain only a data item in the auxiliary storage means which corresponds to the data search item, the control means further comprising means to store an instruction designating a search area in the main storage means, the control means being operative to control the gate means to gate the data items from the main storage means into the auxiliary storage means only from the search area in the main storage means.

2. The data storage device according to claim 1, in which the main storage means comprises a drum memory.

3. The data storage device according to claim 1, in which the gate means has a data input and a data output.

4. The data storage device according to claim 3 further comprising central processing unit means for producing the data items at the data input and to receive the data items from the data output.

5. The data storage device according to claim 3, in which the control means is operative to gate the data items from the data input to the main storage means and from the main storage means to the data output.

6. The data storage device according to claim 5, in which the control means is operative to gate the data items from the data input to the auxiliary storage means and from the auxiliary storage means to the main storage means.

7. The data storage device according to claim 5, in which the control means is operative to control the gate means to gate the data items from the main storage means to the auxiliary storage means and from the auxiliary storage means to the data output.

8. A data storage device, comprising:
a main storage means operative to store data items therein;
an auxiliary storage means;
a gate means operatively connected to the main storage means and the auxiliary storage means;
a comparator means operative to store therein a data search item and having an input connected to the auxiliary storage means, the comparator means being operative to compare the data search item with the data items in the auxiliary storage means, the comparator means being operable to function in a plurality of comparison modes, the device further comprising mode designation means connected to control the comparator means and operative to store therein a comparison mode designation; and
a control means operatively connected to said gate means, said control means having an input connected to the comparator means and being operative to control the gate means in such a manner as to sequentially gate the data items from the main storage means into the auxiliary storage means and to retain only a data item in the auxiliary storage means which corresponds to the search item.

* * * * *